United States Patent
Miwa

(10) Patent No.: US 8,565,930 B2
(45) Date of Patent: Oct. 22, 2013

(54) CHARGING SYSTEM, VEHICLE, AND CHARGING SYSTEM CONTROL METHOD

(75) Inventor: Koji Miwa, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 124 days.

(21) Appl. No.: 13/123,830

(22) PCT Filed: May 28, 2009

(86) PCT No.: PCT/JP2009/059748
§ 371 (c)(1),
(2), (4) Date: Apr. 12, 2011

(87) PCT Pub. No.: WO2010/137145
PCT Pub. Date: Dec. 2, 2010

(65) Prior Publication Data
US 2011/0196545 A1 Aug. 11, 2011

(51) Int. Cl.
G05D 3/12 (2006.01)
G05D 23/00 (2006.01)
H02J 7/00 (2006.01)
H02J 7/14 (2006.01)
B65B 1/30 (2006.01)
B65B 1/04 (2006.01)
G01N 31/00 (2006.01)
G01N 15/00 (2006.01)

(52) U.S. Cl.
USPC ........... 700/292; 700/275; 700/286; 700/300; 320/104; 320/109; 320/128; 702/22; 702/57; 141/83; 141/95; 141/192; 141/312

(58) Field of Classification Search
CPC .................. Y02T 10/7005; B60L 11/1861
USPC ................ 320/104, 107, 108, 109, 128, 137; 701/22, 36; 702/22, 57, 58, 61; 180/65.3, 271; 700/275, 286, 296, 300; 307/31, 64; 141/83, 95, 96, 100, 104, 141/192, 231, 312, 368
See application file for complete search history.

(56) References Cited

U.S. PATENT DOCUMENTS 5,677,614 A * 10/1997 Ohmori et al. ................ 320/103
6,382,269 B1 * 5/2002 Tatsuno .......................... 141/94

(Continued)

FOREIGN PATENT DOCUMENTS

JP 2-18141 A 1/1990
JP 5-328619 A 12/1993

(Continued)

OTHER PUBLICATIONS

Soma et al., JP-2008-167618, machine translation/TEXT (http://www.ipdl.inpit.go.jp/homepg_e.ipdl).*

(Continued)

*Primary Examiner* — Kavita Padmanabhan
*Assistant Examiner* — Darrin Dunn
(74) *Attorney, Agent, or Firm* — Kenyon & Kenyon LLP

(57) ABSTRACT

An ECU operates a charging unit such that a power storage device is charged by an electric power from a power supply. When a vehicle moves while charging the unit charges the power storage device, the ECU stops charging the unit to discontinue the charging of the power storage device. The ECU diagnoses a state of the charging unit after the charging of the power storage device is stopped. The ECU determines whether the charging of the power storage device is able to be resumed based on the diagnostic result. When determining that the charging of the power storage device is able to be resumed, the ECU resumes the charging of the power storage device by resuming the operation of the charging unit.

10 Claims, 11 Drawing Sheets

(56) References Cited

U.S. PATENT DOCUMENTS

| | | | |
|---|---|---|---|
| 7,795,841 B2* | 9/2010 | Matsumoto | 320/109 |
| 2003/0037981 A1* | 2/2003 | Scholer et al. | 180/271 |
| 2009/0085522 A1 | 4/2009 | Matsumoto | |
| 2010/0201309 A1* | 8/2010 | Meek | 320/108 |
| 2010/0235006 A1* | 9/2010 | Brown | 700/286 |

FOREIGN PATENT DOCUMENTS

| | | | |
|---|---|---|---|
| JP | 6-105408 A | | 4/1994 |
| JP | 7-39012 A | | 2/1995 |
| JP | 8-505277 A | | 6/1996 |
| JP | 2000-232737 A | | 8/2000 |
| JP | 2008167618 A | * | 7/2008 |
| WO | 94/09558 A1 | | 4/1994 |

OTHER PUBLICATIONS

Soma et al., JP-2008-167618, machine translation/DRAWINGS (http://www.ipdl.inpit.go.jp/homepg_e.ipdln).*

* cited by examiner

CHARGING SYSTEM, VEHICLE, AND CHARGING SYSTEM CONTROL METHOD

This is a 371 national phase application of PCT/JP2009/059748 filed 28 May 2009, the content of which is incorporated herein by reference.

TECHNICAL FIELD

The present invention relates to a charging system, a vehicle, and a charging system control method, and particularly to a technology for charging a power storage device mounted on the vehicle by a power supply provided outside the vehicle.

BACKGROUND ART

A vehicle such as an electric vehicle, a hybrid vehicle, and a fuel cell vehicle recently draws public attention as an eco-friendly vehicle. The vehicle includes an electric motor that generates a running driving force and a power storage device in which an electric power supplied to the electric motor is stored.

There has been a configuration in which the power storage device mounted on the vehicle is charged by a power supply provided outside the vehicle (hereinafter referred to as an "external power supply"). For example, Japanese Patent Laying-Open No. 05-328619 (Patent Document 1) discloses a charging device that is configured to charge an electric vehicle from a charger through a cable. The charger charges the electric vehicle based on a signal supplied from a switch that detects a connection state of a connector provided in a leading end portion of the cable, a signal supplied from a switch provided in a coupling that is separated by a tension applied to the cable, and a signal supplied from a start switch that is used to start the charging.

PRIOR ART DOCUMENTS

Patent Documents

Patent Document 1: Japanese Patent Laying-Open No. 05-328619
Patent Document 2: Japanese Patent Laying-Open No. 06-105408
Patent Document 3: National Patent Publication No. 08-505277

SUMMARY OF THE INVENTION

Problems to be Solved by the Invention

A cable is possibly broken when a vehicle moves while the vehicle remains connected to the cable. According to Japanese Patent Laying-Open No. 05-328619, the coupling is provided in the middle of the cable, and is configured to be able to be separated into a plug and a socket. When the vehicle moved mistakenly during the charging of the vehicle, the plug and the socket are separated from each other by the tension applied to the cable. Therefore, the charging of the vehicle can be stopped while the breakage of the cable is prevented. However, according to the technology disclosed in Japanese Patent Laying-Open No. 05-328619, it is necessary to connect the plug to the socket in order to resume the charging of a power storage device. Accordingly, possibly a need for work of a user arises in order to resume the charging. In this point, there is room for improvement.

An object of the present invention is to provide a technology for being able to save the user the trouble when the charging of the vehicle is resumed after the charging is temporarily stopped.

Means for Solving the Problems

In accordance with an aspect of the present invention, a charging system for charging a power storage device mounted on a vehicle by a power supply provided outside the vehicle. The charging system includes: a charging unit configured to be able to charge the power storage device by an electric power supplied from the power supply when the vehicle is in a rest state; and a charging control unit configured to control the charging unit. The charging control unit includes a charging execution unit, a detection unit, a charging stopping unit, a diagnostic unit, a determination unit, and a charging resuming unit. The charging execution unit is configured to operate the charging unit in order to charge the power storage device. The detection unit is configured to detect a change in position of the vehicle. The charging stopping unit is configured to cause the charging unit to stop the charging of the power storage device, when the detection unit detects the change in position of the vehicle from a starting position of the charging of the power storage device while the charging unit charges the power storage device. The diagnostic unit is configured to diagnose a state of the charging unit associated with a supply of the electric power, when the charging stopping unit stops the charging of the power storage device. The determination unit is configured to determine whether the charging unit is able to resume the charging of the power storage device based on a diagnostic result of the diagnostic unit. The charging resuming unit is configured to cause the charging unit to resume the charging of the power storage device, when the determination unit determines that the operation of the charging unit is able to be resumed.

Preferably the vehicle includes an operating device for controlling the vehicle so as to put the vehicle in the rest state according to an operation of an operator. The charging control unit further includes an estimation unit configured to estimate that the vehicle is in the rest state, based on the operation of the operating device by the operator. The charging execution unit is configured to cause the charging unit to start the charging of the power storage device, when the estimation unit estimates that the vehicle is in the rest state.

Preferably, the charging control unit further includes an information producing unit and a storage unit. The information producing unit is configured to produce first information and second information, the first information indicates that the charging stopping unit stops the charging of the power storage device, and the second information indicates that the charging resuming unit resumes the charging of the power storage device. The storage unit is configured to store the first information and the second information therein.

Preferably, the charging unit includes: a cable for transferring the electric power from the power supply to the vehicle; an inlet provided in the vehicle to be able to be connected to the cable; and a charger. The charger is provided in the vehicle, and the charger is configured to supply the electric power fed into the inlet to the power storage device under the control of the charging execution unit and the charging resuming unit while stopping the supply of the electric power to the power storage device under the control of the charging stopping unit. The diagnostic unit is configured to diagnose the state of the charging unit by detecting at least a state of the cable and a connection state between the cable and the inlet.

Preferably, the charging unit includes a power receiving unit and a charger. The power receiving unit is provided in the vehicle, and the power receiving unit is configured to be able to receive the electric power in a non-contact manner from the power supply within a predetermined range. The charger is provided in the vehicle, and the charger is configured to supply the electric power received by the power receiving unit to the power storage device under the control of the charging execution unit and the charging resuming unit while stopping the supply of the electric power to the power storage device under the control of the charging stopping unit. The diagnostic unit is configured to diagnose the state of the charging unit by detecting whether a position of the power receiving unit falls within a predetermined range.

In accordance with another aspect of the present invention, a vehicle includes a power storage device; a charging unit configured to be able to charge the power storage device by an electric power from supplied from the power supply when the vehicle is in a rest state; and a charging control unit configured to control the charging unit. The charging control unit includes a charging execution unit, a detection unit, a charging stopping unit, a diagnostic unit, a determination unit, and a charging resuming unit. The charging execution unit is configured to operate the charging unit in order to charge the power storage device. The detection unit is configured to detect a change in position of the vehicle. The charging stopping unit is configured to cause the charging unit to stop a charging of the power storage device when the detection unit detects the change in position of the vehicle from a starting position of the charging of the power storage device while the charging unit charges the power storage device. The diagnostic unit is configured to diagnose a state of the charging unit associated with a supply of the electric power, when the charging stopping unit stops the charging of the power storage device. The determination unit is configured to determine whether an operation of the charging unit is able to be resumed based on a diagnostic result of the diagnostic unit. The charging resuming unit is configured to cause the charging unit to resume the charging of the power storage device, when the determination unit determines that the operation of the charging unit is able to be resumed.

In accordance with still another aspect of the present invention, a charging system control method is a method for controlling charging system for charging a power storage device mounted on a vehicle by a power supply provided outside the vehicle. The charging system includes: a charging unit configured to be able to charge the power storage device by an electric power supplied from the power supply when the vehicle is in a rest state; and a charging control unit configured to control the charging unit. The charging system control method includes the steps of: operating the charging unit in order to charge the power storage device; determining whether a position of the vehicle changes from a starting position of a charging of the power storage device while the charging unit charges the power storage device; causing the charging unit to stop the charging of the power storage device when the determination is made that the position of the vehicle changes from the starting position of the charging of the power storage device; diagnosing a state of the charging unit associated with a supply of the electric power, when the charging of the power storage device is stopped; determining whether an operation of the charging unit is able to be resumed based on a diagnostic result of the diagnostic step; and causing the charging unit to resume the charging of the power storage device when the determination is made that the operation of the charging unit is able to be resumed.

Effects of the Invention

According to the present invention, the user can be saved the trouble when the charging of the vehicle is resumed after the charging is temporarily stopped.

MODES FOR CARRYING OUT THE INVENTION

Figure 1:
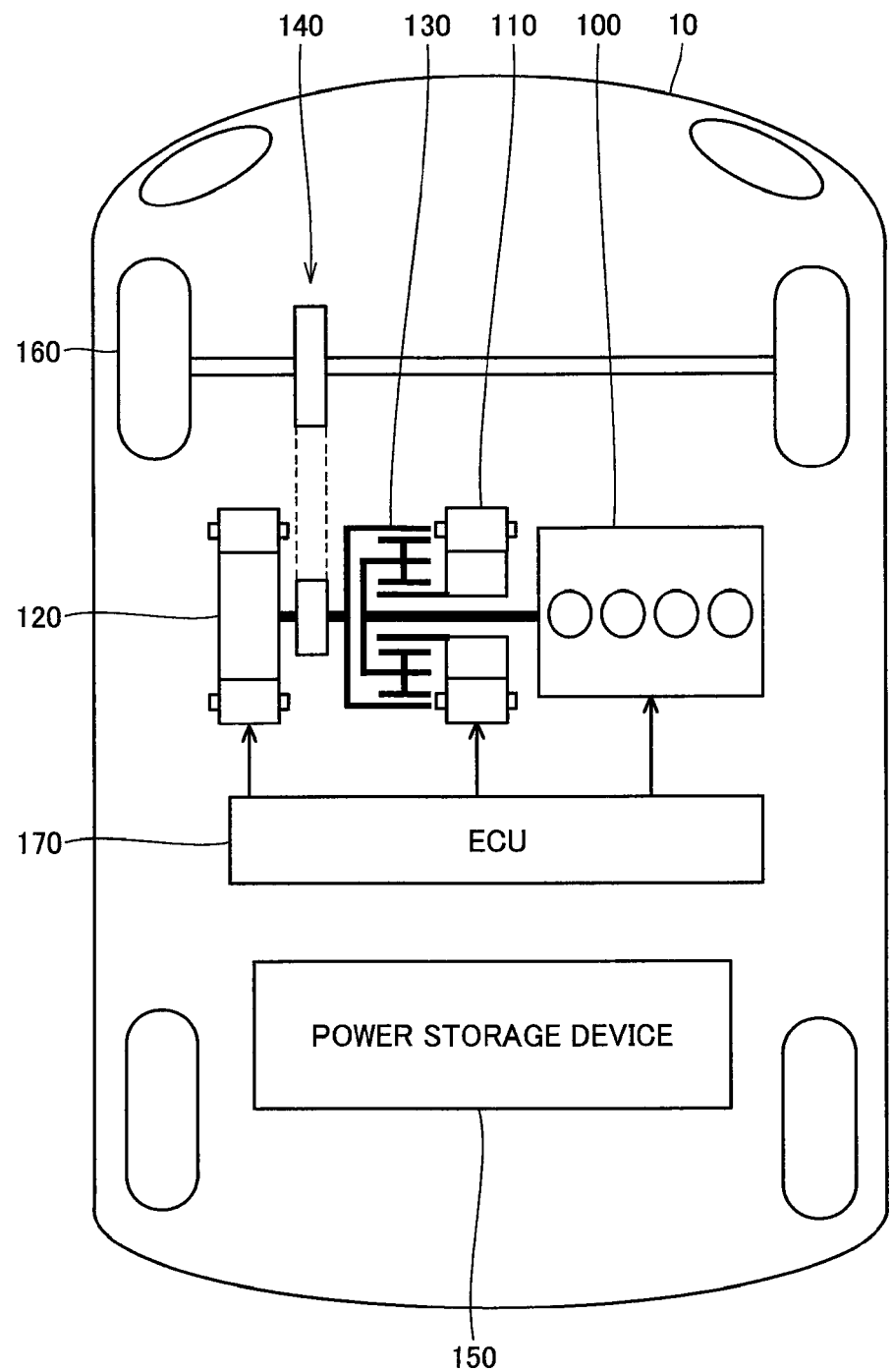
FIG. 1 is an entire block diagram of a hybrid vehicle that is of an example of a vehicle according to an embodiment of the present invention.

Hereinafter, embodiments of the present invention will be described in detail with reference to the drawings. In the drawings, the same or equivalent component is designated by the same reference character, and a description thereof will not be repeated.

FIG. 1 is an entire block diagram showing a hybrid vehicle that is of an example of a vehicle according to an embodiment of the present invention. Referring to FIG. 1, a hybrid vehicle 10 includes an engine 100, a Motor Generator (MG) 110, an MG 120, a power split mechanism 130, a speed reducer 140, a power storage device 150, a drive wheel 160, and an Electronic Control Unit (ECU) 170.

Engine 100, MG 110, and MG 120 are coupled to power split mechanism 130. Hybrid vehicle 10 runs by a driving force from at least one of engine 100 and MG 120. Power split mechanism 130 divides power generated by engine 100 into two pathways. That is, one of the pathways is one that transmitted to drive wheel 160 through speed reducer 140, and the other pathway is one that is transmitted to MG 110.

Engine 100 is an internal combustion engine that combusts fuel such as gasoline to generate the power.

MG 110 is an alternating-current rotating electrical machine and, for example, MG 110 is a three-phase alternating-current synchronous electric motor including a U-phase coil, a V-phase coil, and a W-phase coil. MG 110 generates an electric power using the power of engine 100, which is divided by power split mechanism 130. For example, engine 100 is started up to generate the electric power with MG 110 when a charging state (hereinafter also referred to as "SOC (State Of Charge") of power storage device 150 becomes lower than a predetermined value. The electric power generated by MG 110 is converted from an alternating current into a direct current by an inverter (described later). A voltage of the direct-current power from the inverter is adjusted by a converter (described later), and the direct-current power is stored in power storage device 150.

MG 120 is an alternating-current rotating electric machine and, for example, MG 120 is an alternating-current synchronous electric motor includes a U-phase coil, a V-phase coil, and a W-phase coil. MG 120 generates a driving force using at least one of the electric power stored in power storage device 150 and the electric power generated by MG 110. The driving force of MG 120 is transmitted to drive wheel 160 via speed reducer 140. Therefore, MG 120 assists engine 100, or the vehicle runs by the driving force from MG 120. In FIG. 1, drive wheel 160 is shown as a front wheel. However, instead of the front wheel or along with the front wheel, the rear wheel may be driven.

During braking of the vehicle, MG 120 is driven by drive wheel 160 through speed reducer 140, and MG 120 acts as a generator. Therefore, MG 120 acts a regeneration brake that converts the braking energy into the electric power. The electric power generated by MG 120 is stored in power storage device 150.

Power split mechanism 130 includes a planet gear, and the planet gear includes a sun gear, a pinion gear, a carrier, and a ring gear. The pinion gear engages the sun gear and the ring gear. The carrier supports the pinion gear so that the pinion gear can rotate on its own axis, and is coupled to a crankshaft of engine 100. The sun gear is coupled to a rotating shaft of MG 110. The ring gear is coupled to a rotating shaft of MG 120 and speed reducer 140.

Engine 100, MG 110, and MG 120 are coupled to each other while power split mechanism 130 including the planet gear is interposed therebetween, whereby the rotating speeds of engine 100, MG 110 and MG 120 become a relationship connected by a straight line in a nomographic diagram.

Power storage device 150 is a chargeable-dischargeable direct-current power supply. For example, power storage device 150 includes a secondary battery such as a nickel-hydrogen secondary battery and a lithium-ion secondary battery. In addition to the electric powers generated by MG 110 and MG 120, as described later, an electric power supplied from a power supply outside the vehicle is stored in power storage device 150.

A large-capacity capacitor may be used as power storage device 150. Any power storage device may be used as power storage device 150 as long as the power storage device is a power buffer in which the electric powers generated by MG 110 and MG 120 and the electric power supplied from a power supply outside the vehicle can temporarily be stored while the stored electric powers are supplied to MG 120. There is no particular limitation to the number of power storage devices mounted on hybrid vehicle 10. Accordingly, a plurality of power storage devices may be mounted on hybrid vehicle 10. Capacities of the plurality of power storage devices may actually be equal to or different from one another.

ECU 170 controls engine 100, MG 110, and MG 120. It should be noted that ECU 170 may be divided into a plurality of ECUs respectively serving several functions.

A configuration for storing power storage device 150 mounted on hybrid vehicle 10 will be described below in each embodiment.

First Embodiment

Figure 2:
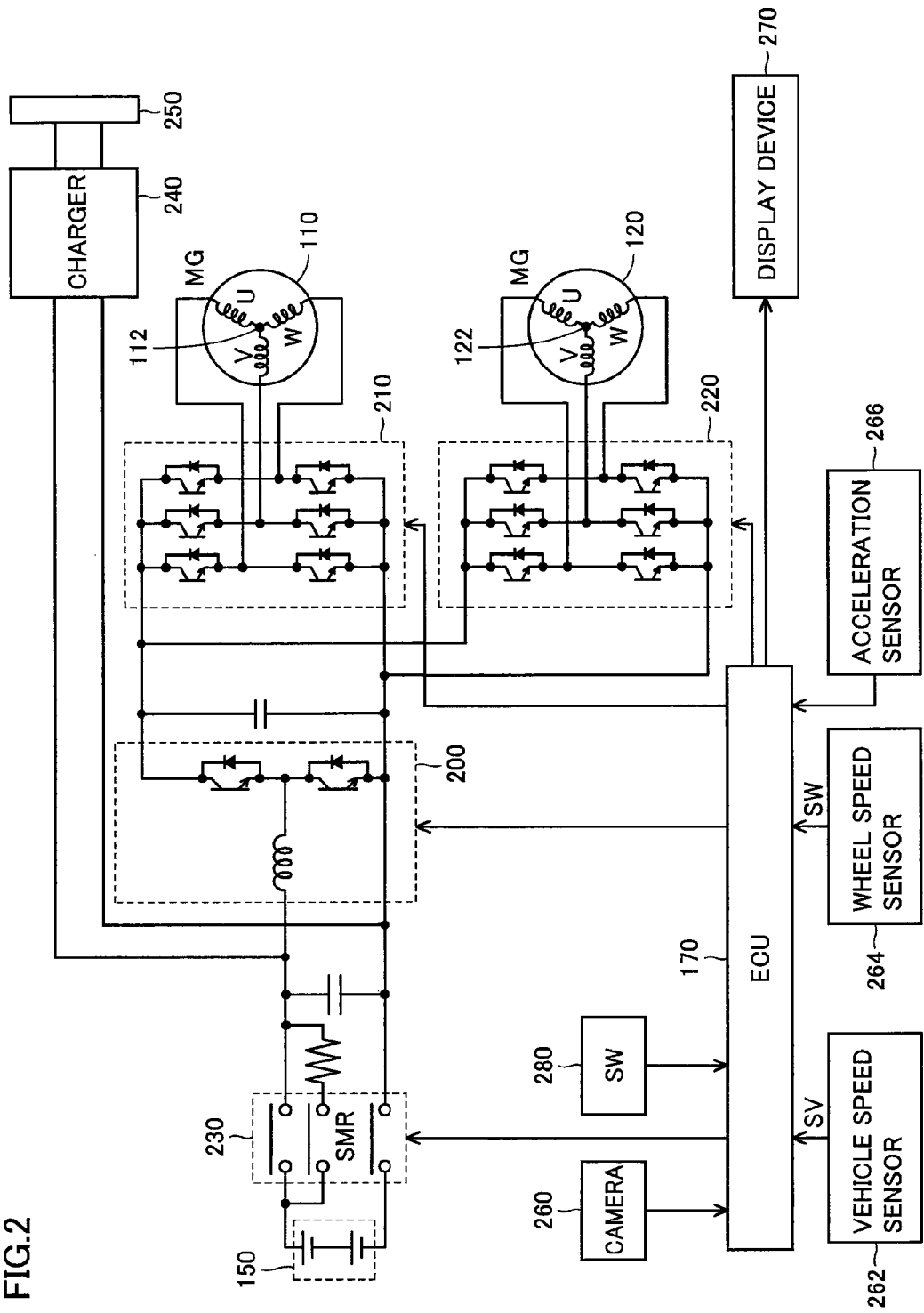
FIG. 2 is an entire configuration diagram showing an electric system of a hybrid vehicle according to a first embodiment.

FIG. 2 is an entire configuration diagram showing an electric system of a hybrid vehicle according to a first embodiment. Referring to FIG. 2, hybrid vehicle 10 includes a converter 200, an inverter 210, an inverter 220, a System Main Relay (SMR) 230, a charger 240, an inlet 250, a camera 260, a vehicle speed sensor 262, a wheel speed sensor 264, an acceleration sensor 266, a display device 270, and a start/stop switch 280.

Converter 200 includes a reactor, two npn-type transistors, and two diodes. In the reactor, one end is connected onto a positive electrode side of power storage device 150, and the other end is connected to a connection node of the two npn-type transistors. The two npn-type transistors are connected in series, and the diode is connected in antiparallel to each npn-type transistor.

For example, an Insulated Gate Bipolar Transistor (IGBT) can be used as the npn-type transistor. A power switching element such as a power Metal Oxide Semiconductor Field-Effect Transistor (MOSFET) may be used instead of the npn-type transistor.

Converter 200 boosts a voltage supplied from power storage device 150 when the electric power discharged from power storage device 150 is supplied to MG 110 or MG 120. On the other hand, converter 200 performs a step-down operation when power storage device 150 is charged by the electric power generated by MG 110 or MG 120.

Each of inverters 210 and 220 includes a U-phase arm, a V-phase arm, and a W-phase arm. The U-phase arm, the V-phase arm, and the W-phase arm are connected in parallel. Each of the U-phase arm, the V-phase arm, and the W-phase arm includes two npn-type transistors that are connected in series. A diode that passes a current from an emitter side to a collector side is connected between a collector and an emitter of each npn-type transistor.

A connection point of the two npn-type transistors in each arm of inverter 210 is connected to an end portion corresponding to each arm, and the end portion is different from a neutral point 112 of a stator coil of MG 110. A connection point of the two npn-type transistors in each arm of inverter 220 is connected to an end portion corresponding to each arm, and the end portion is different from a neutral point 122 of a stator coil of MG 120.

Inverter 210 converts the direct current supplied from power storage device 150 into the alternating current and supplies the alternating current to MG 110. Inverter 210 also converts the alternating current generated by MG 110 into the direct current. Inverter 220 converts the direct current supplied from power storage device 150 into the alternating current and supplies the alternating current to MG 120. Inverter 220 also converts the alternating current generated by MG 120 into the direct current.

ECU 170 controls converter 200, inverter 210, and inverter 220.

SMR 230 is provided between power storage device 150 and charger 240. SMR 230 switches between an opened state and a closed state under the control of ECU 170. When SMR 230 is in the opened state, power storage device 150 is electrically cut off from converter 200 and charger 240. When SMR 230 is in the closed state, power storage device 150 is electrically connected to converter 200 and charger 240.

Inlet 250 is provided in hybrid vehicle 10 in order to receive the electric power supplied from the external power supply. Inlet 250 is configured to be able to be connected to a cable unit (not shown) through which the electric power is sent from external power supply. Inlet 250 is connected to the external power supply via the cable unit, whereby inlet 250 receives the electric power supplied from the external power supply.

Charger 240 is connected between power storage device 150 and converter 200. Charger 240 converts the alternating-current power fed into inlet 250 into the direct-current power and supplies the direct-current power to power storage device 150. The direct-current power is supplied from charger 240 to power storage device 150, thereby charging power storage device 150.

Camera 260 takes an image of a neighborhood of hybrid vehicle 10. The image taken by camera 260 is sent to ECU 170.

Vehicle speed sensor 262 detects a speed SV of hybrid vehicle 10 and outputs the detection value to ECU 170. Wheel speed sensor 264 detects a speed SW of a wheel (for example, drive wheel 160 of FIG. 1) of hybrid vehicle 10 and outputs the detection value to ECU 170. Acceleration sensor 266 detects acceleration of hybrid vehicle 10 and outputs the detection value to ECU 170.

Display device 270 displays various kinds of information under the control of ECU 170. For example, display device 270 displays the image taken by camera 260. For example, display device 270 displays processing result of ECU 170.

Start/stop switch 280 is manipulated by a user in order to start up and stop the electric system of FIG. 2. When start/stop switch 280 is turned on, ECU 170 starts up the electric system in order to cause hybrid vehicle 10 to be able to run. On the other hand, when start/stop switch 280 is turned off, ECU 170 controls SMR 230 so as to put SMR 230 in the opened state while stopping converter 200 and inverters 210 and 220. Therefore, the vehicle stops.

Although not shown in FIGS. 1 and 2, hybrid vehicle 10 further includes devices, such as a braking device and a parking lock mechanism, which fix hybrid vehicle 10 into the rest state. The devices, such as the braking device, which fix hybrid vehicle 10 into the rest state and start/stop switch 280 correspond to a state control device that controls hybrid vehicle 10 so as to put hybrid vehicle 10 in the rest state by operation of the user (operator).

Figure 3:
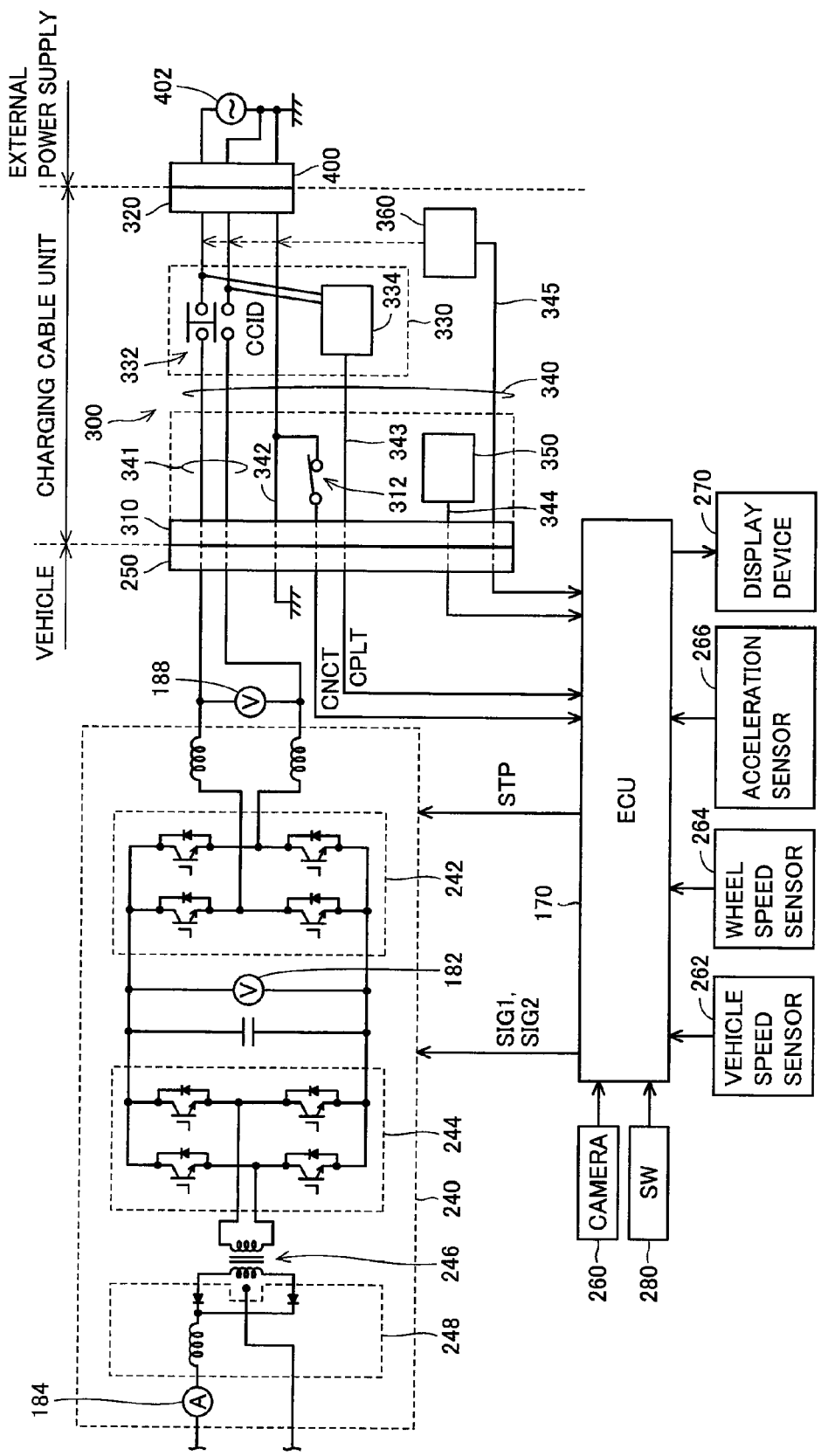
FIG. 3 is a diagram for illustrating a configuration in which the hybrid vehicle of the first embodiment is charged by an external power supply.

FIG. 3 is a view for illustrating a configuration in which the hybrid vehicle of the first embodiment is charged by an external power supply. Referring to FIG. 3, charger 240 includes an AC/DC conversion circuit 242, a DC/AC conversion circuit 244, an insulation transformer 246, and a rectifying circuit 248.

AC/DC conversion circuit 242 converts the alternating-current power into the direct-current power based on a driving signal SIG1 from ECU 170. AC/DC conversion circuit 242 also acts as a boosting chopper circuit that boosts the voltage with the coil as the reactor. Based on a driving signal SIG2 from ECU 170, DC/AC conversion circuit 244 converts the direct-current power into the high-frequency alternating-current power and outputs the high-frequency alternating-current power to insulation transformer 246.

Insulation transformer 246 includes a core made of a magnetic material, a primary coil, and a secondary coil. The primary coil and the secondary coil are wound on the core. The primary coil and the secondary coil are electrically insulated from each other, and the primary coil and the secondary coil are connected to DC/AC conversion circuit 244 and rectifying circuit 248, respectively. Insulation transformer 246 converts the high-frequency alternating-current power received from DC/AC conversion circuit 244 into the alternating-current power having a voltage level according to a winding ratio of the primary coil and the secondary coil, and insulation transformer 246 outputs the converted alternating-current power to rectifying circuit 248. Rectifying circuit 248 rectifies the alternating-current power output from insulation transformer 246 into the direct-current power.

A voltage sensor 182 detects a voltage (voltage between terminals of smoothing capacitor) between AC/DC conversion circuit 242 and DC/AC conversion circuit 244, and a signal indicating the detection result is fed into ECU 170. A current sensor 184 detects the output current of charger 240, and a signal indicating the detection result is fed into ECU 170.

ECU 170 produces the driving signal SIG1 and SIG2 to output the driving signal SIG1 and SIG2 to charger 240, when power storage device 150 is charged by a power supply 402 outside the vehicle. On the other hand, when the charging of power storage device 150 is stopped, ECU 170 produces a stopping signal STP in order to stop charger 240 and outputs the stopping signal STP to charger 240. AC/DC conversion circuit 242 and DC/AC conversion circuit 244 are stopped by stopping signal STP.

ECU 170 has not only the function of controlling charger 240 but also a function of detecting failure of charger 240. The failure of charger 240 is detected when the voltage detected by voltage sensor 182 and/or the current detected by current sensor 184 is not lower than a threshold.

A charging cable unit 300 is used to couple hybrid vehicle 10 and power supply 402. Charging cable unit 300 includes a connector 310, a plug 320, a Charging Circuit Interrupt Device (CCID) 330, a cable 340, an acceleration sensor 350, and a strain gauge 360. Cable 340 includes an electric power line pair 341, a ground line 342, and signal lines 343 to 345.

Connector 310 is connected to inlet 250 provided in hybrid vehicle 10. Switch 312 is provided in connector 310. When connector 310 is connected to inlet 250, switch 312 becomes a closed state while a signal CNCT is fed into ECU 170. Signal CNCT indicates the state in which connector 310 is connected to inlet 250.

Plug 320 is connected to an outlet 400 to which the alternating-current power is supplied from power supply 402. For example, outlet 400 is provided in a charging station.

CCID 330 includes a relay 332 and a control pilot circuit 334. A pathway through which the electric power is supplied to hybrid vehicle 10 from power supply 402 outside hybrid vehicle 10 is cut off when relay 332 is in the opened state. The electric power can be supplied to hybrid vehicle 10 from power supply 402 when relay 332 is in the closed state. Connector 310 is connected to inlet 250, whereby ECU 170 controls relay 332.

When plug 320 is connected to outlet 400, control pilot circuit 334 is operated by the electric power supplied from power supply 402. Control pilot circuit 334 produces a pilot signal CPLT. Pilot signal CPLT is transmitted via signal line 343 to ECU 170 of the vehicle.

Control pilot circuit 334 oscillates pilot signal CPLT with a specified duty cycle (ratio of a pulse width to an oscillation period). The duty cycle is set based on a rated current that can be supplied from power supply 402 to the vehicle through charging cable unit 300. The rated current is defined in each cable (electric power line). Because the rated current depends on a kind of the cable, the duty cycle of pilot signal CPLT also depends on the kind of the cable. ECU 170 can detect the rated current, which can be supplied to the vehicle from power supply 402 through charging cable unit 300, by detecting the duty cycle of pilot signal CPLT.

The alternating-current voltage of power supply 402 is detected by a voltage sensor 188 provided in hybrid vehicle 10. The detected voltage is transmitted to ECU 170.

Acceleration sensor 350 detects acceleration of connector 310, which is caused by the movement of connector 310, and acceleration sensor 350 sends the detection value to ECU 170. The detection value of acceleration sensor 350 is sent to ECU 170 via signal line 344. Strain gauge 360 detects tension acting on cable 340 and sends the detection value to ECU 170. The detection value of strain gauge 360 is sent to ECU 170 via signal line 345.

During the charging of power storage device 150, SMR 230 and relay 332 of CCID 330 are closed, and charger 240 is operated such that the electric power is supplied from power supply 402 to power storage device 150. In the first embodiment, whether a position of hybrid vehicle 10 changes from a position in which the charging is started (hereinafter referred to as an "initial position") is detected during the charging of power storage device 150. At least one of camera 260, vehicle speed sensor 262, wheel speed sensor 264, acceleration sensor 266, acceleration sensor 350, and strain gauge 360 is used in order to detect the change in position of hybrid vehicle 10. However, from the viewpoint of detection accuracy, at least two of the above-described devices are preferably used in order to detect the change in position of the vehicle.

As used herein, the "change in position" includes movement of the vehicle in a traveling direction (forward direction and backward direction) of the vehicle, movement of the vehicle in a right and left direction with respect to the traveling direction of the vehicle, vibration of the vehicle, and inclination of the vehicle.

An example of processing for detecting the change in position of the vehicle will be described below. Camera 260 takes the image of the neighborhood of the vehicle when the charging of power storage device 150 is started. ECU 170 obtains the image data from camera 260, and the image data is stored in ECU 170. Camera 260 takes the image of the neighborhood of the vehicle at constant period and outputs the image data to ECU 170. ECU 170 compares the image obtained from camera 260 and a previously-stored image. ECU 170 detects the change in position of hybrid vehicle 10 based on the comparison result. ECU 170 computes an amount of change in position of hybrid vehicle 10.

Because the vehicle is in the rest state at the beginning of the charging, the detection value of vehicle speed sensor 262 (or wheel speed sensor 264) becomes a value indicating a speed of zero. When the vehicle travels forward or backward, the detection value of the sensor changes. ECU 170 detects the change in position of hybrid vehicle 10 based on the detection value of vehicle speed sensor 262. ECU 170 computes the amount of change in position of hybrid vehicle 10 based on the detection value.

When hybrid vehicle 10 moves during the charging of power storage device 150, cable 340 moves and connector 310 connected to inlet 250 moves. Acceleration sensor 350 detects the acceleration of connector 310. Therefore, the movement of the vehicle can be detected. Because the tension acting on cable 340 changes by the movement of cable 340, the detection value of strain gauge 360 also changes. Accordingly, the movement of the vehicle can be detected based on the detection value of strain gauge 360.

The vibration or inclination of the vehicle can be detected by acceleration sensor 266. For example, when the vehicle vibrates, the acceleration in the vibration direction is detected by acceleration sensor 266. When the vehicle inclines, for example, a component of gravitational acceleration in the inclination direction of the vehicle is detected by acceleration sensor 266.

Figure 4:
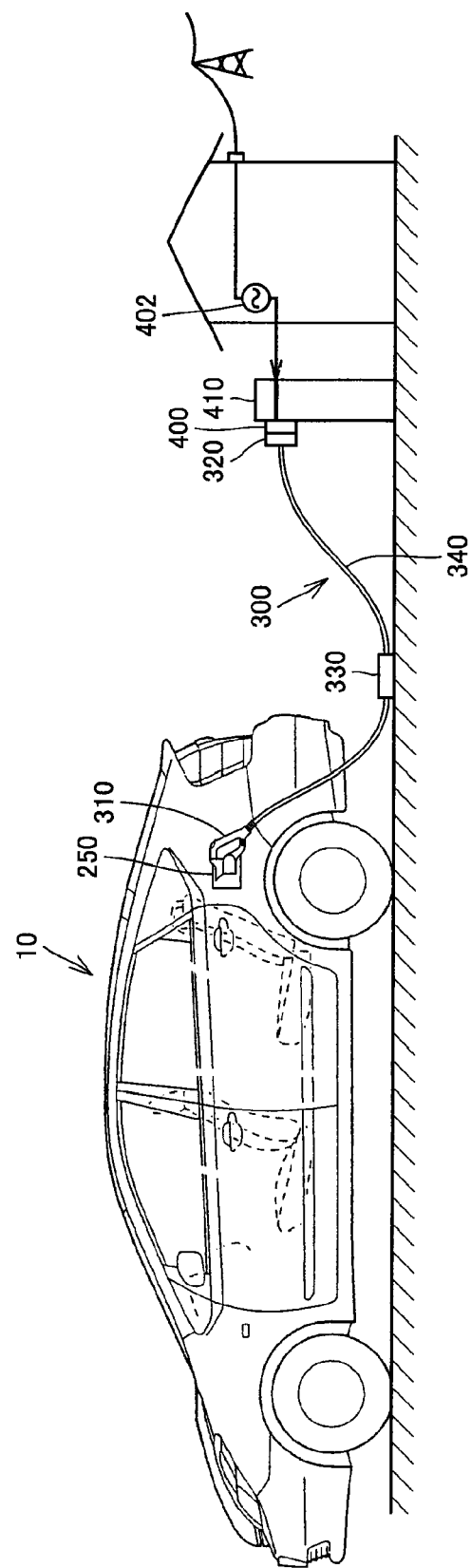
FIG. 4 is a view for illustrating an example of the external power supply that can supply an electric power to the hybrid vehicle.

FIG. 4 is a view for illustrating an example of the external power supply that can supply the electric power to the hybrid vehicle. Referring to FIG. 4, a charging station 410 is a facility that supplies the electric power to hybrid vehicle 10. For example, charging station 410 is installed close to a parking space for hybrid vehicle 10.

Charging station 410 includes an outlet 400. Outlet 400 is connected to power supply 402. Typically, power supply 402 supplies the electric power from a system power supply. Alternatively, power supply 402 may supply the electric power generated by a generator (e.g., a solar battery panel). Power supply 402 may supply the electric power output from the power storage device in which the electric power generated by the generator is stored.

Connector 310 provided at one end of cable 340 is connected to inlet 250 provided in hybrid vehicle 10. Plug 320 provided at the other end of cable 340 is connected to outlet 400 provided in charging station 410.

Figure 5:
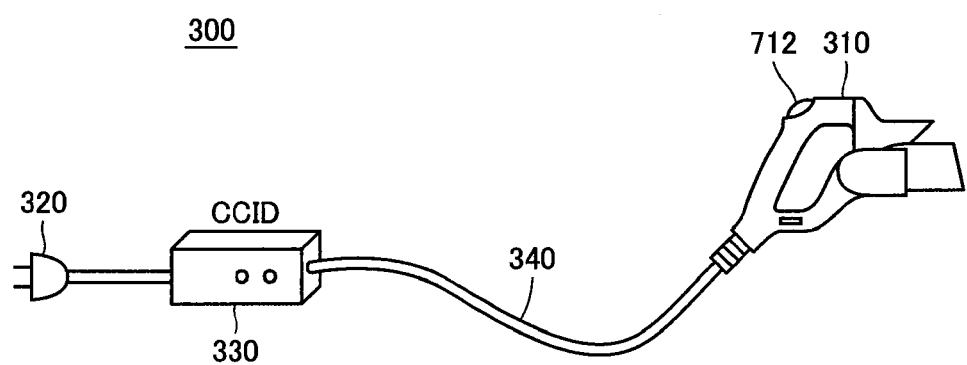
FIG. 5 is a view showing an outline of an appearance of a charging cable unit.

FIG. 5 is a view showing an outline of an appearance of the charging cable unit. Referring to FIG. 5, when connected to inlet 250 of hybrid vehicle 10, connector 310 is fixed to inlet 250 by a lock mechanism (not shown). A lock release button 712 is provided in connector 310. When the user manipulates lock release button 712, connector 310 connected to inlet 250 can be separated from hybrid vehicle 10.

Referring back to FIG. 4, hybrid vehicle 10 is controlled so as to be put in the rest state when the power storage device mounted on hybrid vehicle 10 is charged. However, when hybrid vehicle 10 moves for any reason, for example, possibly cable 340 is broken. Accordingly, in the first embodiment, the charging of the power storage device is stopped when the vehicle moves during the charging of the power storage device. The charging of the power storage device is resumed when the charging unit such as the cable is in a normal state.

Figure 6:
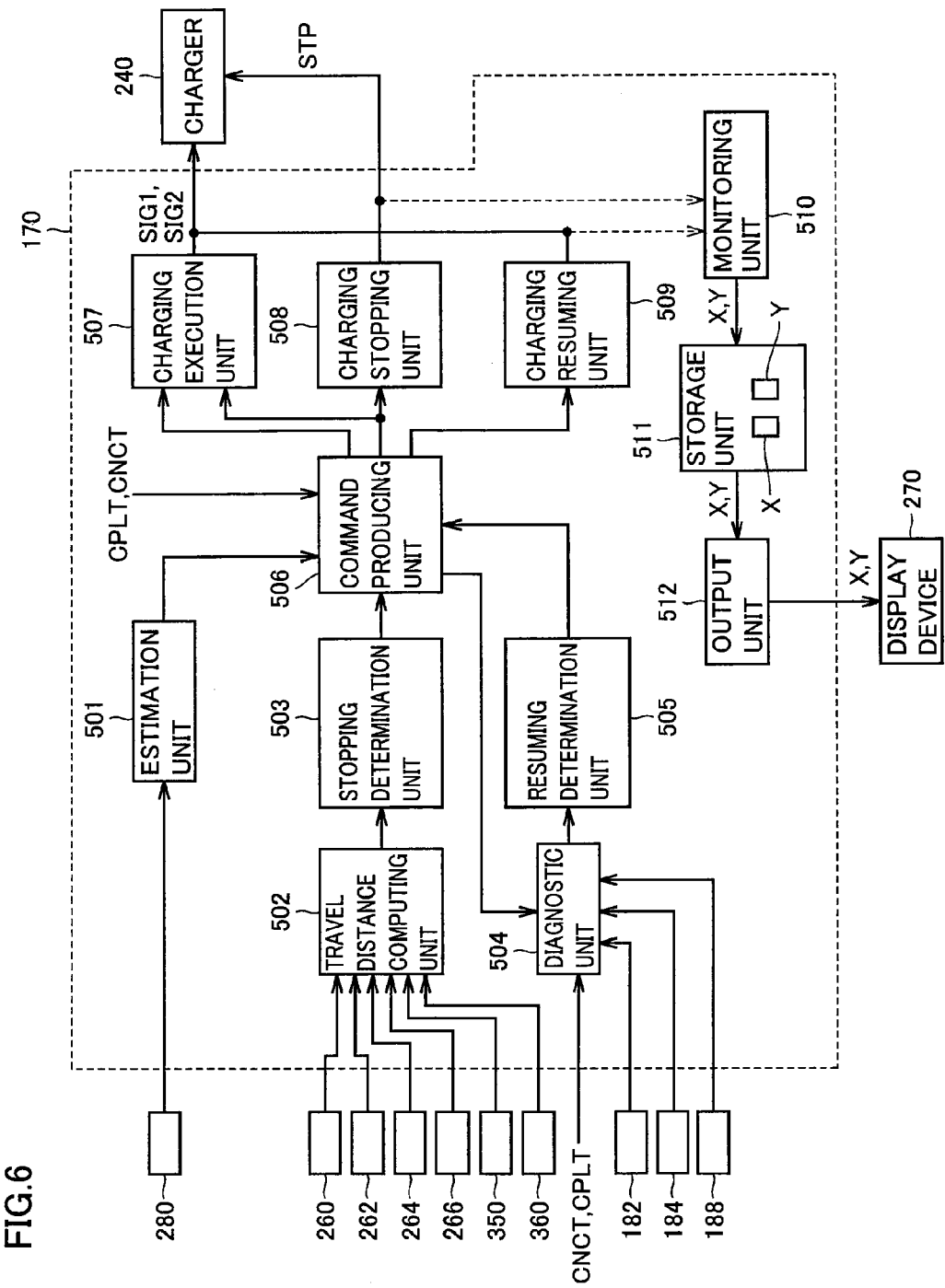
FIG. 6 is a block diagram for illustrating a configuration of an ECU of the first embodiment.

FIG. 6 is a block diagram for illustrating a configuration of the ECU of the first embodiment. FIG. 6 particularly shows the configuration relating to control of the charging of the power storage device. Referring to FIG. 6, ECU 170 includes an estimation unit 501, a travel distance, computing unit 502, a stopping determination unit 503, a diagnostic unit 504, a resuming determination unit 505, a command producing unit 506, a charging execution unit 507, a charging stopping unit 508, a charging resuming unit 509, a monitoring unit 510, a storage unit 511, and an output unit 512.

Estimation unit 501 estimates that hybrid vehicle 10 is in the rest state based on the user operation in which hybrid vehicle 10 is controlled so as to be put in the rest state. Specifically, estimation unit 501 estimates that hybrid vehicle 10 is in the rest state when the user turns off start/stop switch280. Estimation unit 501 may estimate that hybrid vehicle 10 is in the rest state by detecting the user operation that activates the braking device or parking lock mechanism.

Based on the image from camera 260 and/or the detection values of various sensors, travel distance computing unit 502 performs the processing to calculate a vehicle travel distance.

Stopping determination unit 503 determines whether a need for stopping the charging of the power storage device arises based on the vehicle travel distance calculated by travel distance computing unit 502. Stopping determination unit 503 sends the determination result to diagnostic unit 504 and command producing unit 506.

Diagnostic unit 504 diagnoses the state of the charging unit including charging cable charging 300, inlet 250, and charger 240 based on signals CPLT and CNCT sent from charging cable charging 300, the detection value of voltage sensor 188 provided between charger 240 and inlet 250, and the detection values of voltage sensors 182 and 184 provided in charger 240. As used herein, the "state of the charging unit" means the state relating to the supply of the electric power of the charging unit, and specifically the "state of the charging unit" means the presence or absence of the cable breakage, the connection state between connector 310 and inlet 250, and the like.

Resuming determination unit 505 determines whether the charging of the power storage device can be resumed based on the diagnostic result of diagnostic unit 504. When the diagnostic result of diagnostic unit 504 indicates that the charging unit is normal, resuming determination unit 505 determines that the charging of the power storage device can be resumed. On the other hand, when the diagnostic result of diagnostic unit 504 indicates that the charging unit is abnormal, resuming determination unit 505 determines that the charging of the power storage device cannot be resumed.

Command producing unit 506 receives signals CPLT and CNCT to determine whether the vehicle can receive the electric power from the power supply. Command producing unit 506 receives the estimation result of estimation unit 501. When the vehicle can receive the electric power from the power supply while the vehicle is in the rest state, command producing unit 506 produces a command for operating charger 240 and sends the command to charging execution unit 507.

Command producing unit 506 also receives the determination result of stopping determination unit 503. When stopping determination unit 503 determines that the need for stopping the charging of the power storage device arises, command producing unit 506 produces a command for stopping charger 240 and sends the command to charging execution unit 507 and charging stopping unit 508.

Command producing unit 506 also receives the determination result of resuming determination unit 505. When resuming determination unit 505 determines that the charging of the power storage device can be resumed, command producing unit 506 produces a command for operating charger 240 and sends the command to charging resuming unit 509.

Charging execution unit 507 receives the command for operating charger 240 from command producing unit 506. Charging execution unit 507 produces signals SIG1 and SIG2 in response to the command and sends signals SIG1 and SIG2 thus produced to charger 240. Charging execution unit 507 stops the production of signals SIG1 and SIG2 when receiving the command for stopping charger 240 from command producing unit 506.

Charging stopping unit 508 receives the command for stopping charger 240 from command producing unit 506. Charging stopping unit 508 produces signal STP in response to the command and transmits signal STP thus produced to charger 240.

Charging resuming unit 509 receives the command for operating charger 240 again from command producing unit 506. Charging resuming unit 509 produces signals SIG1 and SIG2 in response to the command and transmits signals SIG1 and SIG2 thus produced to charger 240.

Monitoring unit 510 monitors the state of charger 240 based on signals SIG1, SIG2, and STP. Monitoring unit 510 produces information X indicating that the charging of the power storage device is stopped, when charging stopping unit 508 outputs signal STP. Monitoring unit 510 produces information Y indicating that the charging of the power storage device is resumed, when charging resuming unit 509 outputs signals S1G1 and SIG2.

The pieces of information X and Y produced by monitoring unit 510 are stored in storage unit 511. Output unit 512 reads at least one of the pieces of information X and Y stored in storage unit 511 and outputs the read information to display device 270. Display device 270 displays the information from output unit 512.

Figure 7:
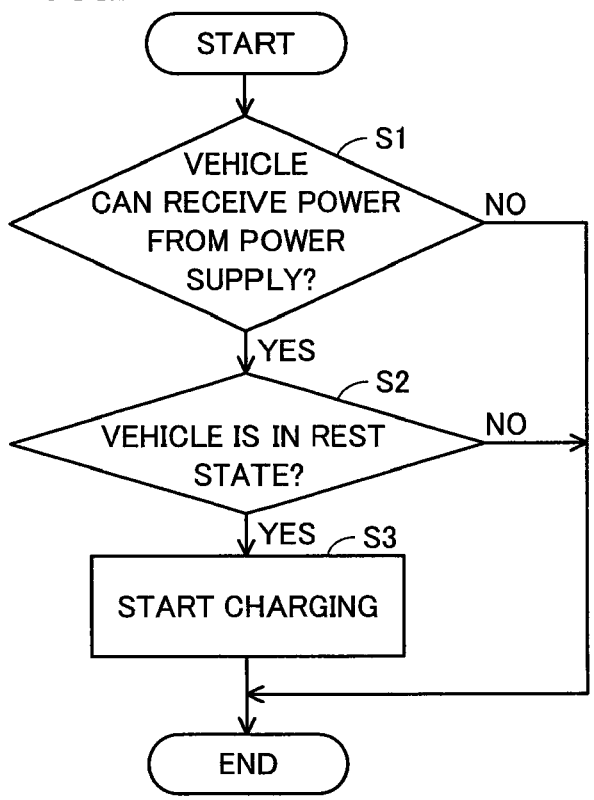
FIG. 7 is a flowchart for illustrating a charging starting processing of a power storage device performed by the ECU.

FIG. 7 is a flowchart for illustrating a charging starting processing of a power storage device performed by the ECU. The processing shown in the flowchart is called from a main routine and performed every predetermined time or when a predetermined condition holds.

Referring to FIGS. 7 and 6, in step S1, ECU 170 determines whether hybrid vehicle 10 can receive the electric power from power supply 402. When signals CNCT and CPLT are fed into command producing unit 506, command producing unit 506 determines that hybrid vehicle 10 can receive the electric power from power supply 402. In this case (YES in step S1), the processing goes to step S2. On the other hand, when at least one of signals CNCT and CPLT is not fed into command producing unit 506, command producing unit 506 determines that hybrid vehicle 10 cannot receive the electric power from power supply 402. In this case (NO in step S1), the whole processing is ended.

In step S2, ECU 170 determines whether hybrid vehicle 10 is in the rest state. Specifically, estimation unit 501 estimates that the vehicle is in the rest state when start/stop switch 280 is in the off state. Command producing unit 506 determines whether hybrid vehicle 10 is in the rest state based on the estimation result of estimation unit 501.

When command producing unit 506 determines that hybrid vehicle 10 is in the rest state (YES in step S2), the processing goes to step S3. On the other hand, when command producing unit 506 determines that hybrid vehicle 10 is not in the rest state (NO in step S2), the whole processing is ended.

In step S3, ECU 170 starts the charging of power storage device 150. Specifically, command producing unit 506 produces the command for operating charger 240 and sends the command to charging execution unit 507. Charging execution unit 507 produces signals SIG1 and S1G2 in response to the command and transmits signals SIG1 and SIG2 thus produced to charger 240. Charger 240 starts the operation for charging power storage device 150 in response to signals SIG1 and SIG2. When the processing in step S3 is ended, the whole processing is ended.

Figure 8:
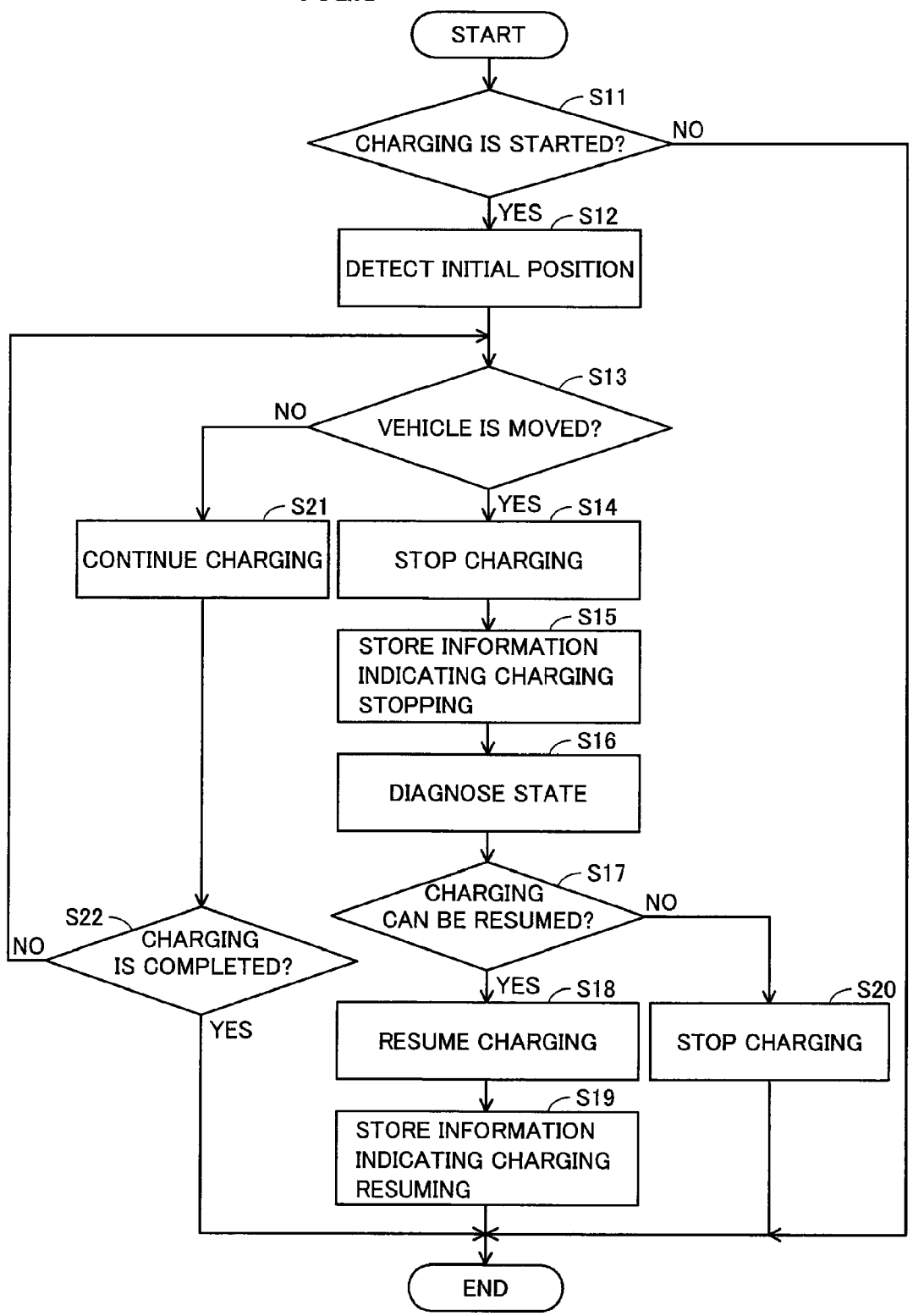
FIG. 8 is a flowchart for illustrating a charging processing of the first embodiment.

FIG. 8 is a flowchart for illustrating a charging processing of the first embodiment. The charging processing of FIG. 8 is performed subsequent to the processing of the flowchart of FIG. 7. Referring to FIG. 8, in step S11, ECU 170 determines whether the charging of the power storage device is started. For example, command producing unit 506 determines that the charging of the power storage device is started when the processing in step S3 of FIG. 7 is performed. In this case (YES in step S11), the processing goes to step S12. On the other hand, when the processing in step S3 of FIG. 7 is not performed, command producing unit 506 determines that the charging of the power storage device is not started. In this case (NO in step S11), the whole processing is ended.

In step S12, ECU 170 detects the initial position of hybrid vehicle 10, that is, the position of hybrid vehicle 10 at the beginning of the charging of power storage device 150. For example, travel distance computing unit 502 detects the initial position by obtaining the image from camera 260 at the beginning of the charging. Alternatively, travel distance computing unit 502 obtains the detection value from vehicle speed sensor 262 at the beginning of the charging. When the detection value does not change, travel distance computing unit 502 detects that the current position of the vehicle is the initial position. As described above, there is no particular limitation to the initial position detecting method.

In step S13, ECU 170 determines whether the hybrid vehicle moves. In step S13, travel distance computing unit 502 computes the travel distance of hybrid vehicle 10. Stopping determination unit 503 determines whether hybrid vehicle 10 moves based on the computed travel distance.

Stopping determination unit 503 determines that the hybrid vehicle is stopped, when the travel distance of the hybrid vehicle is zero. In this case (NO in step S13), the processing goes to step S21. On the other hand, when the travel distance of the hybrid vehicle is not zero, stopping determination unit 503 determines that hybrid vehicle moves. In this case (YES in step S13), the processing goes to step S14.

In step S14, stopping determination unit 503 determines that the need for stopping the charging of the power storage device arises. Stopping determination unit 503 transmits the determination result to command producing unit 506. Command producing unit 506 produces the command for stopping charger 240 in response to the determination result of stopping determination unit 503, and the command producing unit 506 sends the command to charging execution unit 507 and charging stopping unit 508.

Charging execution unit 507 stops the production of signals SIG1 and SIG2 in response to the command from command producing unit 506. Charging stopping unit 508 produces signal STP in response to the command from command producing unit 506. Charger 240 is stopped by signal STP. As a result, the charging of power storage device 150 is stopped.

In step S15, ECU 170 stores the information indicating that the charging of power storage device 150 is stopped. Monitoring unit 510 produces information X indicating that the charging of power storage device 150 is stopped in response to signal STP. Information X is stored in storage unit 511.

In step S16, ECU 170 diagnoses the state of the charging unit including charging cable unit 300, inlet 250, and charger 240. When signals CNCT and CPLT are fed into diagnostic unit 504, diagnostic unit 504 determines that charging cable unit 300 (connector 310) and the vehicle (inlet 250) are normally connected.

For example, diagnostic unit 504 detects the presence or absence of the abnormality of the charging pathway (electric power line pair 341 of the charging cable unit and the electric power line pair on the hybrid vehicle side) through which the electric power is sent from power supply 402 to charger 240 based on the detection values of voltage sensor 188, voltage sensor 182, and current sensor 184. As used herein, the "abnormity" includes an earth fault and disconnection of any one of the two electric power lines, and the like. The abnormal connection of charging cable unit 300 (connector 310) and the vehicle (inlet 250) and the abnormal charging pathway correspond to the abnormal supply state of the electric power of the charging unit.

An electric leakage detector may be provided in hybrid vehicle 10 or charging cable unit 300 in order to detect the electric leakage in the charging pathway. In such cases, diagnostic unit 504 detects the presence or absence of the abnormity of the charging pathway based on the detection result of the electric leakage detector.

In step S17, ECU 170 determines whether the charging of the power storage device can be resumed. Specifically, when diagnostic unit 504 determines that the charging unit is in the normal state, resuming determination unit 505 determines that the charging of the power storage device can be resumed. In this case (YES in step S17), resuming determination unit 505 sends the determination result to command producing unit 506.

Based on the determination result of resuming determination unit 505, command producing unit 506 produces the command for operating charger 240 and sends the command to charging resuming unit 509. Charging resuming unit 509 produces signals SIG1 and SIG2 in response to the command and transmits signals S1G1 and SIG2 thus produced to charger 240. In response to signals SIG1 and SIG2, charger 240 is operated so as to charge power storage device 150. Therefore, the charging of power storage device 150 is resumed (step S18).

In step S19, ECU 170 stores the information indicating that the charging of power storage device 150 is resumed. Specifically, the monitoring unit 510 produces information Y indicating that the charging of power storage device 150 is resumed in response to signals SIG1 and SIG2 from charging resuming unit 509. Information Y is stored in storage unit 511. When the processing in step S19 is ended, the whole processing is ended.

On the other hand, in step S17, when the diagnostic result of diagnostic unit 504 indicates the abnormity of the charging unit, resuming determination unit 505 determines that the charging of power storage device 150 cannot be resumed. In this case (NO in step S17), resuming determination unit 505 sends the determination result to command producing unit 506. In such cases, command producing unit 506 does not produce the command for operating charger 240. Accordingly, the charging of power storage device 150 remains stopped (step S20). When the processing in step S20 is ended, the whole processing is ended.

In step S13, when stopping determination unit 503 determines that hybrid vehicle 10 is stopped (NO in step S13), ECU 170 continues the charging of power storage device 150 (step S21). In step S22, ECU 170 determines whether the charging of power storage device 150 is completed.

For example, ECU 170 estimates the charging state of power storage device 150 based on the voltage, current, and temperature of power storage device 150. ECU 170 determines whether the charging of power storage device 150 is completed based on the estimated state. When ECU 170 determines that the charging of power storage device 150 is completed (YES in step S22), the whole processing is ended. On the other hand, when ECU 170 determines that the charging of power storage device 150 is not completed (NO in step S22), the processing is returned to step S13.

The user operates the start/stop switch (see FIG. 2), the braking device, and the parking lock mechanism, and the like, whereby hybrid vehicle 10 is controlled so as to be put in rest state. Therefore, the breakages of cable 340 and hybrid vehicle 10 caused by running of hybrid vehicle 10 can be prevented. However, for example, when an external force acts on hybrid vehicle 10 due to a tow or a natural disaster such as an earthquake, possibly hybrid vehicle 10 moves without user operation. In such cases, possibly cable 340 and hybrid vehicle 10 are broken.

In the first embodiment, when hybrid vehicle 10 moves during the charging of power storage device 150, ECU 170 discontinues the charging of power storage device 150. Particularly, in the first embodiment, when the vehicle moves without user operation, the charging of power storage device 150 is discontinued. Because the charging is discontinued when the abnormity is probably generated in the charging unit (charging cable unit 300, inlet 250, and charger 240) by the movement of the vehicle, a probability of the progress of the abnormal charging unit or a probability of generating another abnormity can be reduced.

In the first embodiment, ECU 170 diagnoses the state of the charging unit after the charging of power storage device 150 is stopped. ECU 170 determines whether the charging of power storage device 150 can be resumed based on the diagnostic result. When ECU 170 determines that the charging of power storage device 150 can be resumed, ECU 170 resumes the charging of power storage device 150. ECU 170 determines whether the charging of power storage device 150 can be resumed, so that the user can be save the trouble to resume the charging.

When ECU 170 detects that the abnormity exists in the charging unit, ECU 170 does not resume the charging of power storage device 150. In this case, the state in which the charging of power storage device 150 is stopped is continued. Therefore, the probability of the progress of the abnormal charging unit or the probability of generating another abnormity can be reduced.

Second Embodiment

An entire configuration of a hybrid vehicle according to a second embodiment and a configuration of an electric system included in the hybrid vehicle of the second embodiment are similar to those of the first embodiment. A configuration of ECU according to the second embodiment is also similar to that of the first embodiment.

Figure 9:
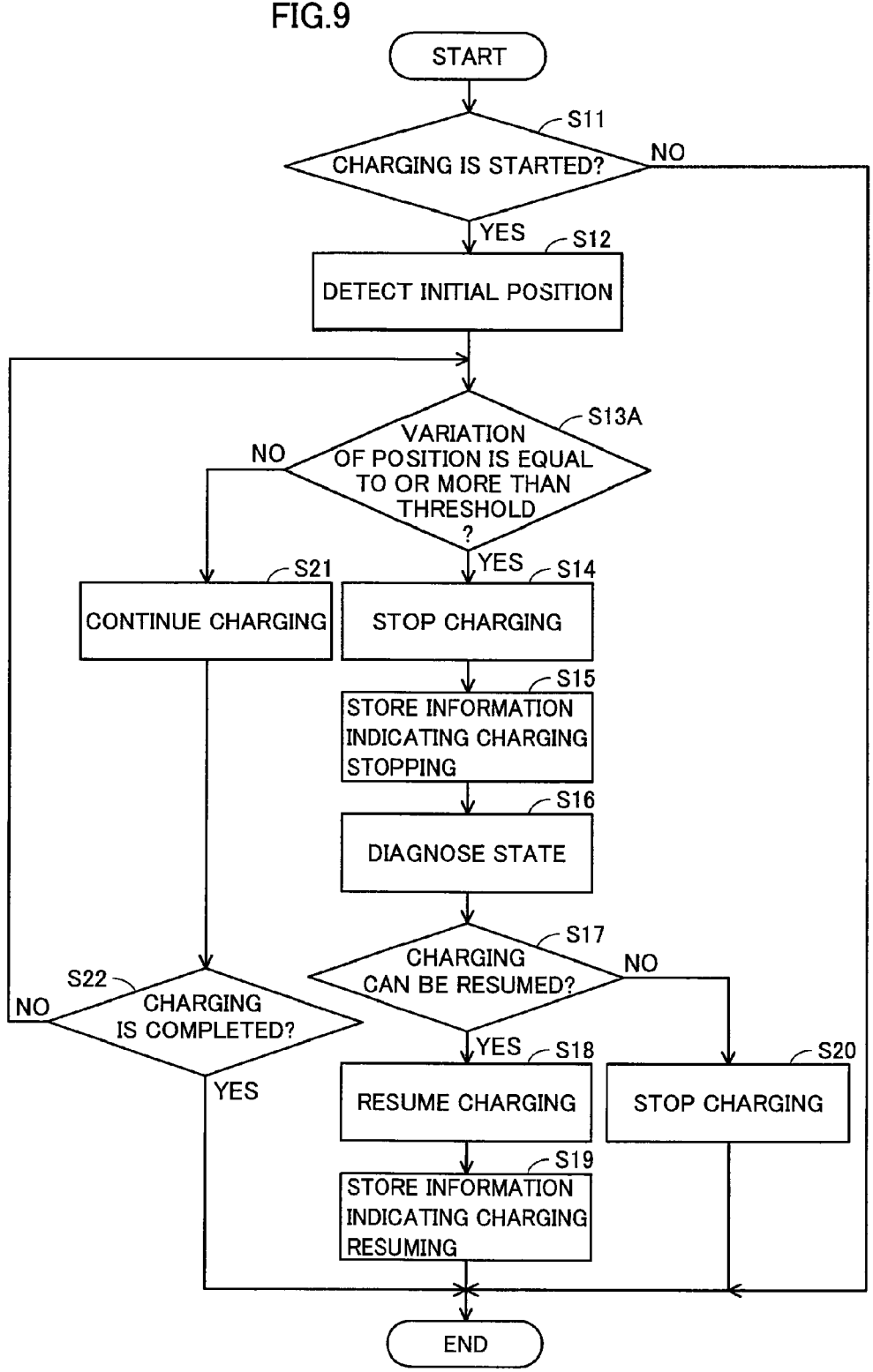
FIG. 9 is a flowchart for illustrating a charging processing according to a second embodiment.

FIG. 9 is a flowchart for illustrating a charging processing of the second embodiment. Referring to FIGS. 9 and 8, the charging processing of the second embodiment differs from that of the first embodiment in that processing in step S13A is performed instead of the processing in step S13. Because other pieces of processing in the flowchart of FIG. 9 are similar to the corresponding pieces of processing in the flowchart of FIG. 8, the processing in step S13A will be described in detail.

In step S13A, ECU 170 determines whether a variation (travel distance) in position of the hybrid vehicle is not lower than a predetermined threshold. As with the first embodiment, in step S13A, travel distance computing unit 502 computes the travel distance of hybrid vehicle 10. Stopping determination unit 503 determines whether the travel distance of hybrid vehicle 10, computed by travel distance computing unit 502, is not lower than the threshold.

For example, the threshold is defined as the travel distance such that the user can easily recognize that the position of the hybrid vehicle differs from the initial position when the user confirms the position of the hybrid vehicle. Accordingly, although there is no particular limitation to the threshold, for example, the travel distance corresponding to one revolution of the hybrid vehicle wheel may be set to the threshold.

When stopping determination unit 503 determines that the travel distance of hybrid vehicle 10 is equal to or more than the threshold (YES in step S13A), the processing goes to step S14. In this case, the charging of power storage device 150 is stopped. On the other hand, when stopping determination unit 503 determines that the travel distance of hybrid vehicle 10 is lower than the threshold (NO in step S13A), the processing goes to step S21. In this case, the charging of power storage device 150 is continued.

When the travel distance of hybrid vehicle 10 is calculated based on the detection value of the sensor, it is considered that the travel distance includes an error caused by a detection error of the sensor. When the travel distance includes the error, for example, even if the hybrid vehicle does not actually move, possibly ECU 170 determines that hybrid vehicle 10 moves. On the other hand, in the second embodiment, ECU 170 determines that hybrid vehicle 10 moves, when the travel distance of hybrid vehicle 10 is equal to or more than the threshold. Therefore, the movement of the hybrid vehicle can be detected more securely during the charging of the power storage device.

Third Embodiment

A hybrid vehicle according to a third embodiment is configured to be able to receive the electric power from the power supply while not being in contact with the power supply. In the third embodiment, the power storage device mounted on the hybrid vehicle is charged while the hybrid vehicle is in the rest state. Because an entire configuration of the hybrid vehicle of the third embodiment is similar to that of FIG. 1, a configuration of a charging system for charging the power storage device will be described in detail below.

Figure 10:
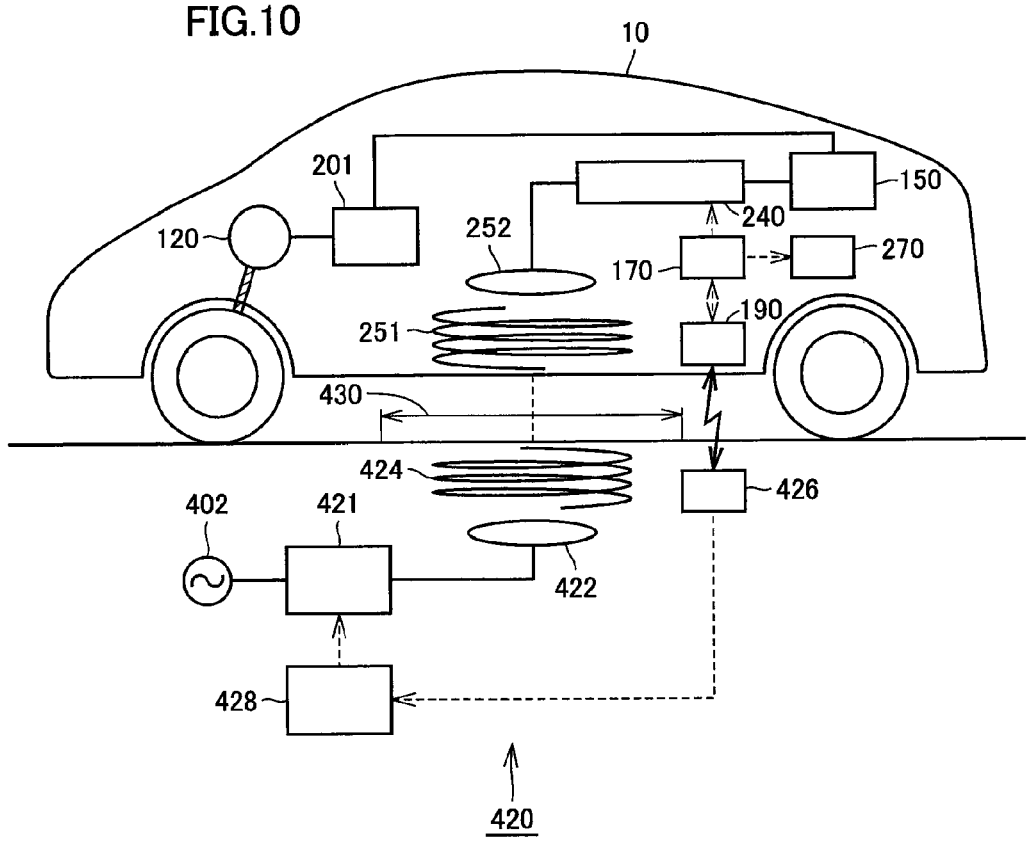
FIG. 10 is an entire configuration diagram of a charging system according to a third embodiment.

FIG. 10 is an entire configuration diagram of a charging system of the third embodiment. Referring to FIG. 10, hybrid vehicle 10 includes a secondary self-resonant coil 251, a secondary coil 252, charger 240, power storage device 150, a Power Control Unit (hereinafter also referred to as a "PCU") 201, MG 120, ECU 170, a communication device 190, and display device 270. PCU 201 includes converter 200 and inverters 210 and 220 (see FIG. 2).

Secondary self-resonant coil 251 is provided in a lower portion of a vehicle body. However, secondary self-resonant coil 251 may be provided in an upper portion of the vehicle body when a power feeding device 420 is provided in the upper portion of the vehicle. Secondary self-resonant coil 251 is an LC resonant coil whose both ends are opened (non-connected), and secondary self-resonant coil 251 receives the electric power from power feeding device 420 by resonating with a primary self-resonant coil 424 (described later) of power feeding device 420 through an electromagnetic field.

In secondary self-resonant coil 251, based on a distance with primary self-resonant coil 424 of power feeding device 420 or a resonant frequency of primary self-resonant coil 424 and secondary self-resonant coil 251, the number of turns is properly set such that a Q value (for example, Q>100) indicating resonant strength between primary self-resonant coil 424 and secondary self-resonant coil 251 and κ indicating a degree of coupling of primary self-resonant coil 424 and secondary self-resonant coil 251 increase.

Secondary coil 252 is provided in coaxial with secondary self-resonant coil 251, and secondary coil 252 can magnetically be coupled to secondary self-resonant coil 251 by electromagnetic induction. Secondary coil 252 takes out the electric power, received by secondary self-resonant coil 251, by the electromagnetic induction to output the electric power to charger 240.

Charger 240 converts the alternating-current power taken out by secondary coil 252 into the direct-current power, and charger 240 converts voltage of the direct-current power into a voltage level of power storage device 150. ECU 170 controls charger 240.

Secondary self-resonant coil 251 and secondary coil 252 constitute a power receiving unit in order to receive the electric power from power supply 402 in the noncontact manner. Secondary self-resonant coil 251, secondary coil 252, and charger 240 constitute the charging unit of the present invention.

Communication device 190 is a communication interface that conducts wireless communication with power feeding device 420 outside the vehicle.

Power feeding device 420 includes power supply 402, a high-frequency power driver 421, a primary coil 422, primary self-resonant coil 424, communication device 426, and an ECU 260.

High-frequency power driver 421 converts the electric power received from power supply 402 into a high-frequency power and supplies the converted high-frequency power to primary coil 422. For example, a frequency of the high-frequency electric power produced by high-frequency power driver 421 ranges from one megahertz to over ten megahertz.

Primary coil 422 is provided in coaxial with primary self-resonant coil 424, and primary coil 422 can magnetically be coupled to primary self-resonant coil 424 by the electromagnetic induction. Primary coil 422 feeds the high-frequency power, supplied from high-frequency power driver 421, to primary self-resonant coil 424 by the electromagnetic induction.

Primary self-resonant coil 424 is provided close to the ground. However, primary self-resonant coil 424 may be provided in the upper portion or side portion of the vehicle when the electric power is fed from above hybrid vehicle 10. Primary self-resonant coil 424 is also an LC resonant coil whose both ends are opened (non-connected) and sends the electric power to hybrid vehicle 10 through secondary self-resonant coil 251 of hybrid vehicle 10 and the electromagnetic field.

In primary self-resonant coil 424, the number of turns is properly set such that a Q value (for example, Q>100), the degree of coupling κ and the like increase based on a distance with secondary self-resonant coil 251 of hybrid vehicle 10 or the resonant frequency of primary self-resonant coil 424 and secondary self-resonant coil 251.

Communication device 426 is a communication interface that conducts wireless communication with hybrid vehicle 10 of the power feeding destination. ECU 428 controls high-frequency power driver 421 such that the power receiving voltage of hybrid vehicle 10 becomes the target value.

Figure 11:
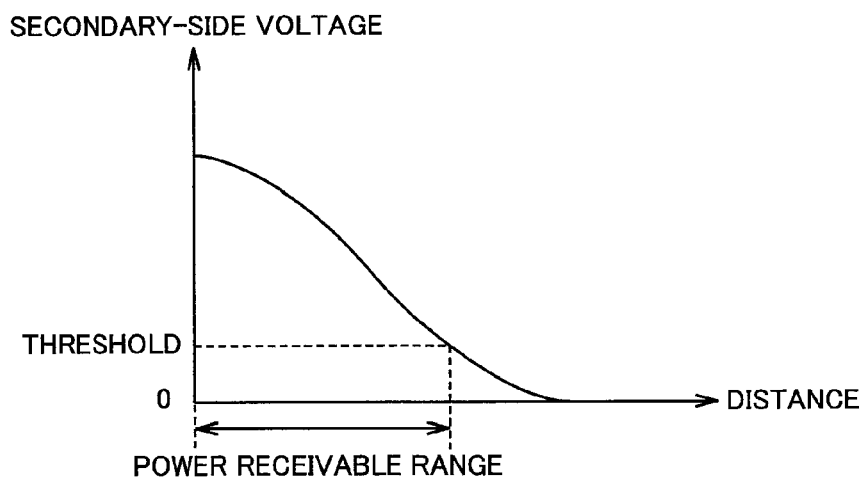
FIG. 11 is a view showing a relationship between a distance of a power feeding device and a hybrid vehicle and a power receiving voltage (secondary-side voltage) of the hybrid vehicle.

It is assumed that primary-side voltage (output voltage from power feeding device 420) is kept constant. As shown in FIG. 11, the secondary-side voltage (power receiving voltage of hybrid vehicle 10) decreases with increasing distance between primary self-resonant coil 424 of power feeding device 420 and secondary self-resonant coil 251 of hybrid vehicle 10. A range where the secondary-side voltage is more than a threshold is previously defined as a power receivable range 430. For example, the threshold is previously defined in consideration of operation efficiency of charger 240.

A relationship of FIG. 11 is previously stored in ECU 170. ECU 170 determines whether secondary self-resonant coil 251 exists within power receivable range 430 based on the relationship of FIG. 11 and the power receiving voltage of hybrid vehicle 10. The power receiving voltage of hybrid vehicle 10 is detected by the voltage sensor.

In the third embodiment, after the power storage device is stopped by the variation in position of the vehicle, ECU 170 detects the position of secondary self-resonant coil 251. When secondary self-resonant coil 251 exists within power receivable range 430, ECU 170 determines that the charging of power storage device 150 can be resumed. On the other hand, when secondary self-resonant coil 251 is out of power receivable range 430, ECU 170 determines that the charging of power storage device 150 cannot be resumed.

Figure 12:
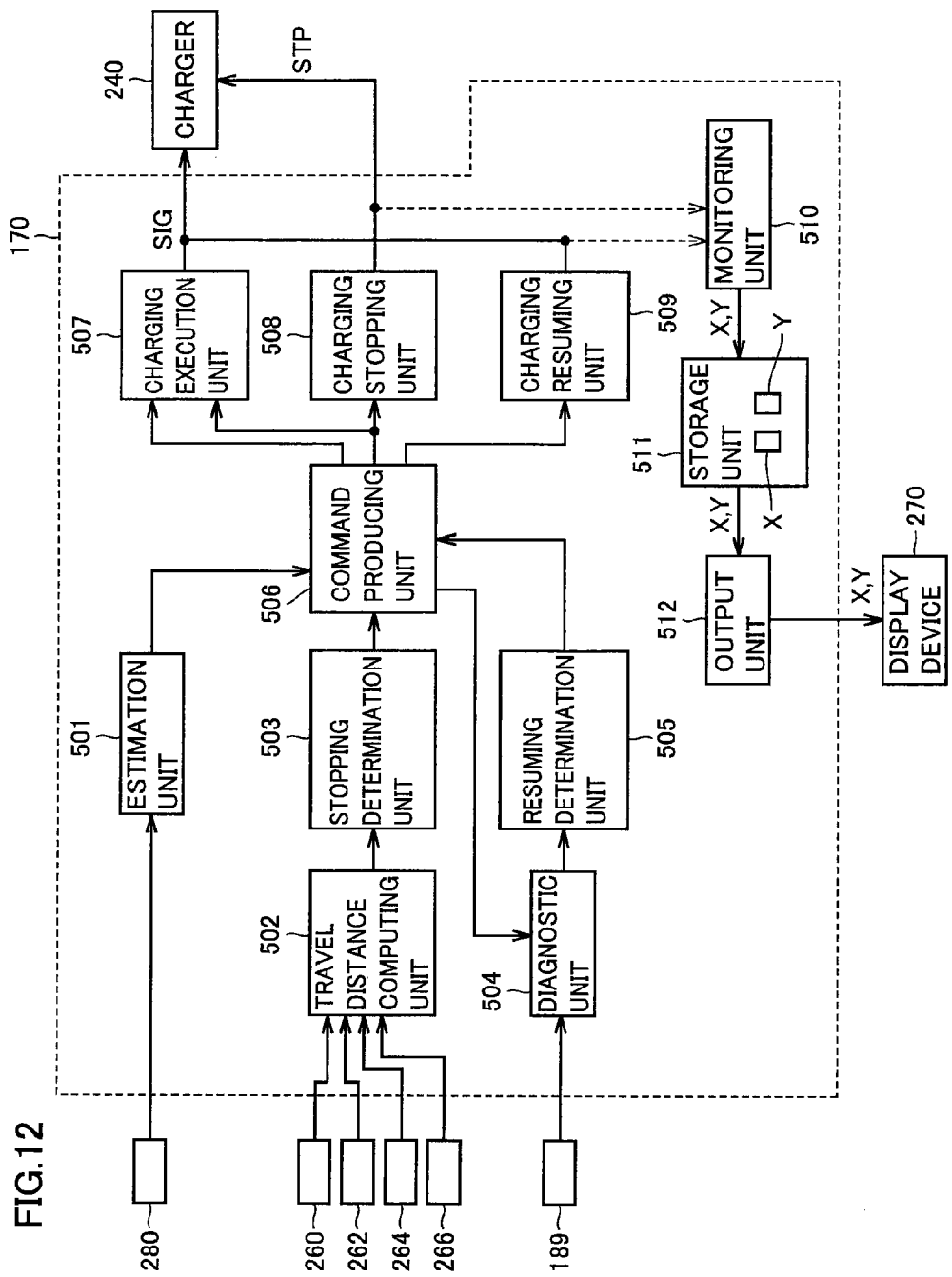
FIG. 12 is a block diagram for illustrating a configuration of an ECU of the third embodiment.

FIG. 12 is a block diagram for illustrating a configuration of the ECU of the third embodiment. Referring to FIGS. 12 and 6, the ECU of the third embodiment differs from the ECU of the first embodiment in the following points.

Because the charging cable unit is not connected to hybrid vehicle 10, the detection value of the sensor provided in the charging cable unit is not fed into travel distance computing unit 502. Similarly, the signal is not fed into command producing unit 506 from the charging cable unit.

The detection value of voltage sensor 189 is fed into diagnostic unit 504 in order to detect the power receiving voltage of hybrid vehicle 10. Diagnostic unit 504 diagnoses the state of the charging unit based on the detection value of voltage sensor 189 and the relationship of FIG. 11.

Charging execution unit 507 and charging resuming unit 509 produce signals SIG in order to operate charger 240 and output signals SIG to charger 240.

Other configurations of ECU of the third embodiment are similar to those of the corresponding portions of ECU of the first embodiment.

In the third embodiment, the following processing is performed in step S16 of the flowcharts of FIGS. 8 and 9. Diagnostic unit 504 detects whether the position of secondary self-resonant coil 251 exists within the power receivable range based on the detection value of voltage sensor 189 and the relationship of FIG. 11. When the detection value of voltage sensor 189 is more than the threshold, diagnostic unit 504 detects that the position of secondary self-resonant coil 251 exists within the power receivable range, and diagnostic unit 504 determines that the electric power is normally supplied by the charging unit. On the other hand, when the detection value of voltage sensor 189 is lower than the threshold, diagnostic unit 504 detects that the position of secondary self-resonant coil 251 is out of the power receivable range, and diagnostic unit 504 determines that the electric power is abnormally supplied by the charging unit.

Thus, in the third embodiment, as with the first and second embodiments, the user can be saved the trouble to resume the charging.

The present invention can be applied to the vehicle on which the power storage device is mounted. In the embodiments, the hybrid vehicle on which the internal combustion engine, the electric motor, and the power storage device are mounted is described as an example of the vehicle on which the electric motor generating the running driving force and the power storage device, in which the electric power supplied to the electric motor is stored, are mounted. However, for example, the present invention can also be applied to the electric vehicle and the fuel-cell vehicle.

It is noted that the embodiments are described only by way of example and the present invention is not limited to the embodiments. The scope of the present invention is shown by not the descriptions of the embodiments but claims, and is intended to include all modifications within similar meanings and ranges to the claims.

DESCRIPTION OF THE REFERENCE SIGNS

10: hybrid vehicle, 100: engine, 112, 122: neutral point, 130: power split mechanism, 140: speed reducer, 150: power storage device, 160: drive wheel, 182, 188, 189: voltage sensor, 184: current sensor, 190: communication device, 200: converter, 210, 220: inverter, 240: charger, 242: AC/DC conversion circuit, 244: DC/AC conversion circuit, 246: insulation transformer, 248: rectifying circuit, 250: inlet, 251: secondary self-resonant coil, 252: secondary coil, 260: camera, 262: vehicle speed sensor, 264: wheel speed sensor, 266, 350: acceleration sensor, 270: display device, 280: start/stop switch, 300: charging cable unit, 310: connector, 312: switch, 320: plug, 332: relay, 334: control pilot circuit, 340: cable, 341: electric power line pair, 342: ground line, 343-345: signal line, 360: strain gauge, 400: outlet, 402: power supply, 410: charging station, 420: power feeding device, 421: high-frequency power driver, 422: primary coil, 424: primary self-resonant coil, 426: communication device, 430: power receivable range, 501: estimation unit, 502: travel distance computing unit, 503: stopping determination unit, 504: diagnostic unit, 505: resuming determination unit, 506: command producing unit, 507: charging execution unit, 508: charging stopping unit, 509: charging resuming unit, 510: monitoring unit, 511: storage unit, 512: output unit, 712: lock release button.

The invention claimed is:

1. A charging system for charging a power storage device mounted on a vehicle by a power supply provided outside said vehicle, said charging system comprising:
 a charging unit configured to be able to charge said power storage device by an electric power supplied from said power supply when said vehicle is in a rest state,
 said charging unit further comprising:
  a cable for transferring the electric power from said power supply to said vehicle;
  an inlet provided in said vehicle to be able to be connected to said cable; and
  a charger provided in said vehicle, said charger being configured to supply the electric power fed into said inlet to said power storage device under the control of said charging execution unit and said charging resuming unit while stopping the supply of the electric power to said power storage device under the control of said charging stopping unit,
  wherein said diagnostic unit is configured to diagnose the state of said charging unit by detecting at least a connection state of said cable and said inlet; and
 a charging control unit configured to control said charging unit,
 said charging control unit including
 a charging execution unit configured to operate said charging unit in order to charge said power storage device,
 a detection unit configured to detect a change in position of said vehicle,
 a charging stopping unit configured to cause said charging unit to stop a charging of said power storage device, when said detection unit detects the change in position of said vehicle from a starting position of the charging of said power storage device while said charging unit charges said power storage device,
 a diagnostic unit configured to diagnose a state of said charging unit associated with a supply of the electric power, when said charging stopping unit stops the charging of said power storage device,
 a determination unit configured to determine whether an operation of said charging unit is able to be resumed, based on a diagnostic result of said diagnostic unit, and
 a charging resuming unit configured to cause said charging unit to resume the charging of said power storage device, when said determination unit determines that the operation of said charging unit is able to be resumed.

2. The charging system according to claim 1, wherein said vehicle includes an operating device for controlling said vehicle so as to put said vehicle in the rest state according to an operation of an operator,
 said charging control unit further includes an estimation unit configured to estimate that said vehicle is in the rest state, based on the operation of said operating device by said operator, and
 said charging execution unit configured to cause said charging unit to start the charging of said power storage device, when said estimation unit estimates that said vehicle is in said rest state.

3. The charging system according to claim 1, wherein said charging control unit further includes:
 an information producing unit configured to produce first information and second information, said first information indicating that said charging stopping unit stops the charging of said power storage device, said second information indicating that said charging resuming unit resumes the charging of said power storage device; and
 a storage unit configured to store said first information and said second information therein.

4. A charging system for charging a power storage device mounted on a vehicle by a power supply provided outside said vehicle, said charging system comprising:
 a charging unit configured to be able to charge said power storage device by an electric power supplied from said power supply when said vehicle is in a rest state; and
 a charging control unit configured to control said charging unit,
 said charging control unit including
 a charging execution unit configured to operate said charging unit in order to charge said power storage device,
 a detection unit configured to detect a change in position of said vehicle,
 a charging stopping unit configured to cause said charging unit to stop a charging of said power storage device, when said detection unit detects the change in position of said vehicle from a starting position of the charging of said power storage device while said charging unit charges said power storage device,
 a diagnostic unit configured to diagnose a state of said charging unit associated with a supply of the electric power, when said charging stopping unit stops the charging of said power storage device,
 a determination unit configured to determine whether an operation of said charging unit is able to be resumed, based on a diagnostic result of said diagnostic unit,
 a charging resuming unit configured to cause said charging unit to resume the charging of said power storage device, when said determination unit determines that the operation of said charging unit is able to be resumed,
 a power receiving unit provided in said vehicle, said power receiving unit being configured to be able to receive the electric power in a non-contact manner from said power supply within a predetermined range; and
 a charger provided in said vehicle, said charger being configured to supply the electric power received by said power receiving unit to said power storage device under the control of said charging execution unit and said charging resuming unit while stopping the supply of the electric power to said power storage device under the control of said charging stopping unit,
 wherein said diagnostic unit is configured to diagnose the state of said charging unit by detecting whether a position of said power receiving unit falls within said predetermined range.

5. The charging system according to claim 4, wherein said vehicle includes an operating device for controlling said vehicle so as to put said vehicle in the rest state according to an operation of an operator,
 said charging control unit further includes an estimation unit configured to estimate that said vehicle is in the rest state, based on the operation of said operating device by said operator, and
 said charging execution unit configured to cause said charging unit to start the charging of said power storage device, when said estimation unit estimates that said vehicle is in said rest state.

6. The charging system according to claim 4, wherein said charging control unit further includes:
an information producing unit configured to produce first information and second information, said first information indicating that said charging stopping unit stops the charging of said power storage device, said second information indicating that said charging resuming unit resumes the charging of said power storage device; and
a storage unit configured to store said first information and said second information therein.

7. A vehicle comprising:
a power storage device;
a charging unit configured to be able to charge said power storage device by an electric power from supplied from a power supply when said vehicle is in a rest state,
said charging unit further comprising:
   a cable for transferring the electric power from said power supply to said vehicle;
   an inlet provided in said vehicle to be able to be connected to said cable; and
   a charger provided in said vehicle, said charger being configured to supply the electric power fed into said inlet to said power storage device under the control of said charging execution unit and said charging resuming unit while stopping the supply of the electric power to said power storage device under the control of said charging stopping unit,
   wherein said diagnostic unit is configured to diagnose the state of said charging unit by detecting at least a connection state of said cable and said inlet; and
a charging control unit configured to control said charging unit,
said charging control unit including
a charging execution unit configured to operate said charging unit in order to charge said power storage device,
a detection unit configured to detect a change in position of said vehicle,
a charging stopping unit configured to cause said charging unit to stop a charging of said power storage device, when said detection unit detects the change in position of said vehicle from a starting position of the charging of said power storage device while said charging unit charges said power storage device,
a diagnostic unit configured to diagnose a state of said charging unit associated with a supply of the electric power, when said charging stopping unit stops the charging of said power storage device,
a determination unit configured to determine whether an operation of said charging unit able to be resumed, based on a diagnostic result of said diagnostic unit,
a charging resuming unit configured to cause said charging unit to resume the charging of said power storage device, when said determination unit determines that the operation of said charging unit is able to be resumed.

8. A method for controlling a charging system for charging a power storage device mounted on a vehicle by a power supply provided outside said vehicle, said charging system including a charging unit configured to be able to charge said power storage device by an electric power supplied from said power supply when said vehicle is in a rest state; and a charging control unit configured to control said charging unit,
said charging unit further comprising:
   a cable for transferring the electric power from said power supply to said vehicle;
   an inlet provided in said vehicle to be able to be connected to said cable; and
   a charger provided in said vehicle, said charger being configured to supply the electric power fed into said inlet to said power storage device under the control of said charging execution unit and said charging resuming unit while stopping the supply of the electric power to said power storage device under the control of said charging stopping unit,
   wherein said diagnostic unit is configured to diagnose the state of said charging unit by detecting at least a connection state of said cable and said inlet; and
said charging system control method comprising the steps of:
operating said charging unit in order to charge said power storage device;
determining whether a position of said vehicle changes from a starting position of a charging of said power storage device while said charging unit charges said power storage device;
causing said charging unit to stop the charging of said power storage device when the determination is made that the position of said vehicle changes from the starting position of the charging of said power storage device;
diagnosing a state of said charging unit associated with a supply of the electric power, when the charging of said power storage device is stopped;
determining whether an operation of said charging unit is able to be resumed based on a diagnostic result of said diagnostic step; and
causing said charging unit to resume the charging of said power storage device when the determination is made that the operation of the charging unit is able to be resumed.

9. A vehicle comprising:
a power storage device;
a charging unit configured to be able to charge said power storage device by an electric power from supplied from a power supply when said vehicle is in a rest state; and
a charging control unit configured to control said charging unit,
said charging control unit including
a charging execution unit configured to operate said charging unit in order to charge said power storage device,
a detection unit configured to detect a change in position of said vehicle,
a charging stopping unit configured to cause said charging unit to stop a charging of said power storage device, when said detection unit detects the change in position of said vehicle from a starting position of the charging of said power storage device while said charging unit charges said power storage device,
a diagnostic unit configured to diagnose a state of said charging unit associated with a supply of the electric power, when said charging stopping unit stops the charging of said power storage device,
a determination unit configured to determine whether an operation of said charging unit able to be resumed, based on a diagnostic result of said diagnostic unit,
a charging resuming unit configured to cause said charging unit to resume the charging of said power storage device, when said determination unit determines that the operation of said charging unit is able to be resumed;
a power receiving unit provided in said vehicle, said power receiving unit being configured to be able to receive the electric power in a non-contact manner from said power supply within a predetermined range; and
a charger provided in said vehicle, said charger being configured to supply the electric power received by said power receiving unit to said power storage device under the control of said charging execution unit and said charging resuming unit while stopping the supply of the electric power to said power storage device under the control of said charging stopping unit, wherein said diagnostic unit is configured to diagnose the state of said charging unit by detecting whether a position of said power receiving unit falls within said predetermined range.

10. A method for controlling a charging system for charging a power storage device mounted on a vehicle by a power supply provided outside said vehicle, said charging system including a charging unit configured to be able to charge said power storage device by an electric power supplied from said power supply when said vehicle is in a rest state; a charging control unit configured to control said charging unit a power receiving unit provided in said vehicle, said power receiving unit being configured to be able to receive the electric power in a non-contact manner from said power supply within a predetermined range; and a charger provided in said vehicle, said charger being configured to supply the electric power received by said power receiving unit to said power storage device under the control of said charging execution unit and said charging resuming unit while stopping the supply of the electric power to said power storage device under the control of said charging stopping unit, wherein said diagnostic unit is configured to diagnose the state of said charging unit by detecting whether a position of said power receiving unit falls within said predetermined range, said charging system control method comprising the steps of:

operating said charging unit in order to charge said power storage device;

determining whether a position of said vehicle changes from a starting position of a charging of said power storage device while said charging unit charges said power storage device;

causing said charging unit to stop the charging of said power storage device when the determination is made that the position of said vehicle changes from the starting position of the charging of said power storage device;

diagnosing a state of said charging unit associated with a supply of the electric power, when the charging of said power storage device is stopped;

determining whether an operation of said charging unit is able to be resumed based on a diagnostic result of said diagnostic step; and causing said charging unit to resume the charging of said power storage device when the determination is made that the operation of the charging unit is able to be resumed.

* * * * *